US012779913B2

(12) United States Patent
Hanna

(10) Patent No.: US 12,779,913 B2
(45) Date of Patent: Nov. 3, 2026

(54) VEHICLE TIRE LOCALIZATION SYSTEM AND METHOD USING TIRE AND/OR WHEEL SENSORS AND DIRECTIONAL ANTENNAS

(71) Applicant: Bridgestone Americas Tire Operations, LLC, Nashville, TN (US)

(72) Inventor: Ramy S. Hanna, Copley, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/806,786

(22) Filed: Aug. 16, 2024

(65) Prior Publication Data

US 2024/0399802 A1 Dec. 5, 2024

Related U.S. Application Data

(63) Continuation of application No. PCT/US2023/067292, filed on May 22, 2023.

(Continued)

(51) Int. Cl.
*B60C 23/04* (2006.01)

(52) U.S. Cl.
CPC ...... *B60C 23/0416* (2013.01); *B60C 23/0452* (2013.01)

(58) Field of Classification Search
CPC ............ B60C 23/0416; B60C 23/0452; B60C 23/0437; B60C 23/0444

(Continued)

(56) References Cited

U.S. PATENT DOCUMENTS 684,751 A 10/1901 Froslid
6,259,361 B1 7/2001 Robillard et al.
(Continued)

FOREIGN PATENT DOCUMENTS

CN 103722992 B 12/2016
EP 2450202 A1 5/2012
(Continued)

OTHER PUBLICATIONS

SAE International, “TPMS Tire Localization with RF Transceiver”, Felix Gow, Mar. 28, 2017, 7 pages.
(Continued)

*Primary Examiner* — Eric Blount

(57) ABSTRACT

A system for vehicle wheel position localization includes sensors mounted on each tire of a vehicle. Each axle of the vehicle is associated with a first directional antenna arranged to capture wireless output signals from each tire on one side and a second directional antenna arranged to capture wireless output signals from each tire on the other side. A data processing unit (e.g., onboard controller, remote server) receives the output signals from each sensor via at least the respective directional antennas, and automatically identifies respective wheel locations on the vehicle based on a mapped relative location for each of the directional antennas and further based on a detected relative output signal strength for any tire and/or wheel sensors associated with axles having a plurality of tires on each side of the vehicle. A switching device may optionally enable selection between each directional antenna for implementation of the respective output signals.

20 Claims, 3 Drawing Sheets

Related U.S. Application Data

(60) Provisional application No. 63/353,886, filed on Jun. 21, 2022.

(58) Field of Classification Search
USPC .......................................................... 340/447
See application file for complete search history.

(56) References Cited

U.S. PATENT DOCUMENTS

| | | | | |
|---|---|---|---|---|
| 6,725,712 | B1 | 4/2004 | King et al. | |
| 6,888,446 | B2 | 5/2005 | Nantz et al. | |
| 6,954,687 | B2 | 10/2005 | Taguchi et al. | |
| 7,256,687 | B2 | 8/2007 | Shibata | |
| 7,260,497 | B2 | 8/2007 | Watabe | |
| 7,268,678 | B2 | 9/2007 | Chakam et al. | |
| 7,348,878 | B2 | 3/2008 | Fogelstrom | |
| 7,367,227 | B2 | 5/2008 | Stewart et al. | |
| 7,385,485 | B2 | 6/2008 | Thomas et al. | |
| 7,404,427 | B2 | 7/2008 | Hillman et al. | |
| 7,428,453 | B2 | 9/2008 | Davenport et al. | |
| 7,506,540 | B1 | 3/2009 | Job | |
| 7,920,057 | B2 | 4/2011 | Costes | |
| 7,948,364 | B2 | 5/2011 | Lin et al. | |
| 7,954,368 | B2 | 6/2011 | Leman | |
| 8,149,100 | B2 | 4/2012 | Gila et al. | |
| 8,200,291 | B2 | 6/2012 | Steinmetz et al. | |
| 8,204,645 | B2 | 6/2012 | Weston | |
| 8,319,605 | B2 | 11/2012 | Hassan et al. | |
| 8,332,103 | B2 | 12/2012 | Greer et al. | |
| 8,332,104 | B2 | 12/2012 | Greer et al. | |
| 8,373,581 | B2 | 2/2013 | Hassan et al. | |
| 8,497,771 | B2 | 7/2013 | Lickfelt et al. | |
| 8,564,428 | B2 | 10/2013 | Lickfelt et al. | |
| 8,659,411 | B2 | 2/2014 | Fink | |
| 8,700,286 | B2 | 4/2014 | Steiner et al. | |
| 8,798,853 | B2 | 8/2014 | Kanenari et al. | |
| 8,903,602 | B2 | 12/2014 | Bailie et al. | |
| 9,020,777 | B2 | 4/2015 | Kessler et al. | |
| 9,139,052 | B2 | 9/2015 | Steiner et al. | |
| 9,205,711 | B2 | 12/2015 | Kessler et al. | |
| 9,227,471 | B2 | 1/2016 | Kosugi et al. | |
| 9,259,977 | B2 | 2/2016 | Kim | |
| 9,278,589 | B2 | 3/2016 | Laifenfeld et al. | |
| 9,340,075 | B2 | 5/2016 | Guan et al. | |
| 9,469,166 | B2 | 10/2016 | Mcintyre et al. | |
| 9,715,511 | B2 | 7/2017 | Champredonde et al. | |
| 9,851,227 | B2 * | 12/2017 | Lammers ............ | B60C 23/0444 |
| 9,872,271 | B2 | 1/2018 | Ericsson et al. | |
| 9,924,077 | B2 | 3/2018 | Cho | |
| 9,950,577 | B1 | 4/2018 | Marlett et al. | |
| 10,075,819 | B2 | 9/2018 | Santavicca et al. | |
| 10,093,138 | B2 | 10/2018 | Decia et al. | |
| 10,118,446 | B2 | 11/2018 | Kim | |
| 10,124,632 | B2 | 11/2018 | Tsujita | |
| 10,220,659 | B2 | 3/2019 | Saburi et al. | |
| 10,300,748 | B2 | 5/2019 | Hassani et al. | |
| 10,406,866 | B2 | 9/2019 | Besnoin et al. | |
| 10,442,253 | B2 | 10/2019 | Werner et al. | |
| 10,583,699 | B2 | 3/2020 | Hassani et al. | |
| 10,596,865 | B2 | 3/2020 | Patel et al. | |
| 10,737,541 | B1 | 8/2020 | Engl et al. | |
| 10,780,749 | B2 | 9/2020 | Hassani et al. | |
| 11,034,196 | B2 | 6/2021 | Stewart et al. | |
| 11,084,335 | B2 | 8/2021 | Zeng et al. | |
| 11,099,091 | B2 | 8/2021 | Stewart et al. | |
| 11,243,303 | B2 | 2/2022 | Osai et al. | |
| 11,285,765 | B2 | 3/2022 | Chen et al. | |
| 11,298,989 | B2 | 4/2022 | Engl et al. | |
| 2004/0044450 | A1 | 3/2004 | Taguchi et al. | |
| 2004/0164854 | A1 | 8/2004 | Nantz et al. | |
| 2005/0172707 | A1 * | 8/2005 | Kanatani ............. | B60C 23/0433 73/146 |
| 2009/0002146 | A1 * | 1/2009 | Lin ..................... | B60C 23/0437 340/447 |
| 2010/0179724 | A1 | 7/2010 | Weston | |
| 2010/0191409 | A1 | 7/2010 | Weston | |
| 2011/0043342 | A1 | 2/2011 | Shepler et al. | |
| 2011/0313611 | A1 | 12/2011 | An et al. | |
| 2012/0259507 | A1 | 10/2012 | Fink | |
| 2013/0035834 | A1 | 2/2013 | Couch et al. | |
| 2013/0289823 | A1 | 10/2013 | Boss | |
| 2013/0321139 | A1 | 12/2013 | Li | |
| 2013/0328674 | A1 * | 12/2013 | Mcintyre ............ | B60C 23/0488 340/442 |
| 2014/0009267 | A1 | 1/2014 | Bracq | |
| 2014/0067193 | A1 | 3/2014 | Gokyu et al. | |
| 2016/0207363 | A1 | 7/2016 | Sogabe | |
| 2016/0263951 | A1 | 9/2016 | Haas | |
| 2019/0265129 | A1 | 8/2019 | Tamura | |
| 2021/0046789 | A1 | 2/2021 | Engl et al. | |
| 2021/0078371 | A1 | 3/2021 | Dickson et al. | |
| 2021/0192868 | A1 | 6/2021 | Han et al. | |
| 2021/0213788 | A1 * | 7/2021 | Honda .................. | B60C 23/007 |
| 2021/0219113 | A1 | 7/2021 | Szemes | |
| 2021/0229507 | A1 * | 7/2021 | Honda .................. | B60C 23/007 |
| 2021/0300130 | A1 | 9/2021 | Broadfield | |

FOREIGN PATENT DOCUMENTS

| | | | |
|---|---|---|---|
| EP | 1924448 | B1 | 10/2012 |
| EP | 2476564 | B1 | 3/2014 |
| EP | 2537689 | B1 | 5/2014 |
| EP | 2582532 | B1 | 9/2014 |
| EP | 2631093 | B1 | 10/2018 |
| EP | 3132953 | B1 | 1/2019 |
| EP | 3322599 | B1 | 7/2020 |
| JP | 2005193797 | A | 7/2005 |
| JP | 2006085711 | A | 3/2006 |
| JP | 2006160189 | A | 6/2006 |
| JP | 2006273077 | A | 10/2006 |
| JP | 4357324 | B2 | 11/2009 |
| JP | 4585357 | B2 | 11/2010 |
| JP | 5569693 | B2 | 8/2014 |
| JP | 5766794 | B2 | 8/2015 |
| JP | 6027266 | B1 | 11/2016 |
| JP | 6451588 | B2 | 1/2019 |
| JP | 6526170 | B2 | 6/2019 |
| JP | 2019209899 | A | 12/2019 |
| JP | 2020501970 | A | 1/2020 |
| JP | 6791173 | B2 | 11/2020 |
| JP | 6844996 | B2 | 3/2021 |
| JP | 2021088228 | A | 6/2021 |
| JP | 2021095128 | A | 6/2021 |
| JP | 6985560 | B1 | 12/2021 |
| KR | 20150100438 | A | 9/2015 |
| TW | 1684751 | B | 2/2020 |
| WO | 2007014600 | A1 | 2/2007 |
| WO | 2008156447 | A1 | 12/2008 |
| WO | 2017149954 | A1 | 9/2017 |
| WO | 2018230594 | A1 | 12/2018 |
| WO | 2021055142 | A1 | 3/2021 |
| WO | 2022051044 | A1 | 3/2022 |

OTHER PUBLICATIONS

HDT Truckinginfo, "Installing either TPMS or ATIS can prevent catastrophic tire damage and reduce maintenance . . . ", 2019, 15 pages.

"Security and Privacy Vulnerabilities of In-Car Wireless Networks: A Tire Pressure Monitoring System Case Study", Rouf et al., 2010, 16 pages.

International Search Report for corresponding patent No. PCT/US2023/067292, Sep. 4, 2023, 11 pages.

European Patent Office, European Search Report in International Application No. 23827942.6-1009/4532230 PCT/US2023067292, dated May 29, 2026, 8 pages.

Japan Patent Office, Japanese Office Action for Application No. JP2024568767, dated Feb. 6, 2026, 6 pages.

* cited by examiner

VEHICLE TIRE LOCALIZATION SYSTEM AND METHOD USING TIRE AND/OR WHEEL SENSORS AND DIRECTIONAL ANTENNAS

CROSS-REFERENCES TO RELATED APPLICATIONS

This application is a continuation of PCT/US2023/067292, filed May 22, 2023, and further claims benefit of U.S. Provisional Patent Application No. 63/353,886, filed Jun. 21, 2022, each of which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present invention relates generally to auto-location of tire and/or wheel sensors on wheeled vehicles. More particularly, systems, methods, and related algorithms as disclosed herein may use tire and/or wheel sensors, directional antennas, and in some embodiments a relative signal strength indicator (RSSI) for tire localization, which may for example be used for fleet management, cost forecasting, and improved prediction of wear for tires of wheeled vehicles including but not limited to motorcycles, consumer vehicles (e.g., passenger and light truck), commercial and off-road (OTR) vehicles.

BACKGROUND

Knowing the relative locations of tire and/or wheel sensors, e.g., tire pressure monitoring system (TPMS) sensors, vehicle mounted sensors, or tire mounted sensors (TMS), is an important feature whether on a passenger or commercial vehicle. For commercial vehicles, the importance may be heightened since they often have eighteen tires and tire positions might change during maintenance. However, most fleet management systems fail to sufficiently track or otherwise document such information. This may create difficulties for a number of important fleet management tasks, such as for example the generation of maintenance alerts, predicting the amount of wear life remaining, forecasting which (and when) tires will need to be replaced, cost projections, etc.

BRIEF SUMMARY

An approach as disclosed herein may accurately and reliably track tire and/or wheel sensors, or output signals thereof, for a given tire with respect to a given vehicle.

A first exemplary embodiment of a system as disclosed herein for vehicle wheel position localization includes at least one tire and/or wheel sensor respectively associated with each of a plurality of tires mounted on a vehicle, wherein the vehicle comprises a plurality of axles having at least one tire on each of a first side and a second side of the vehicle. For each of the axles, a first directional antenna is arranged to capture wireless output signals from the respective at least one tire associated with the axle on the first side and a second directional antenna arranged to capture wireless output signals from the respective at least one tire associated with the axle on the second side. A data processing unit is configured to receive the output signals from each of the tire and/or wheel sensors via at least the respective directional antennas, and further configured to automatically identify a respective wheel location on the vehicle for each of the tire and/or wheel sensors based on a mapped relative location for each of the directional antennas.

In a second embodiment, exemplary further aspects according to the above-referenced first embodiment may include that the vehicle comprises at least one axle having a single tire on each of the first side and the second side and at least one axle having a plurality of tires on each of the first side and the second side, and that the data processing unit is configured to automatically identify the respective wheel location on the vehicle for each of the tire and/or wheel sensors based on the mapped relative location for each of the directional antennas and further based on a detected relative output signal strength for at least the tire and/or wheel sensors associated with the plurality of axles having a plurality of tires on each of the first side and the second side.

In a third embodiment, exemplary further aspects according to the above-referenced first or second embodiment may include that the wireless output signals from each tire comprise data corresponding to one or more measured tire characteristics.

Exemplary further aspects according to the above-referenced third embodiment may include that the wireless output signals from a single tire and/or wheel sensor for at least one tire comprise an identifier unique to the respective tire and the data corresponding to one or more measured tire characteristics.

Alternatively, the wireless output signals from at least one tire may comprise radio frequency identification (RF) signals unique to the respective tire via an RFID tag as a first tire and/or wheel sensor and the data corresponding to one or more measured tire characteristics from a second tire and/or wheel sensor.

Exemplary further aspects according to the above-referenced third embodiment may include that the data processing unit is configured to associate at least one of the one or more measured tire characteristics in data storage with each of the respectively identified tire and/or wheel sensor and the wheel location on the vehicle.

Exemplary further aspects according to the above-referenced third embodiment may include that the data processing unit is configured to detect a change in position for an identified tire and/or wheel sensor and corresponding tire from a first wheel location to a second wheel location on the vehicle, and to aggregate at least one of the one or more measured tire characteristics in data storage as received from the identified tire and/or wheel sensor at each of the first wheel location and the second wheel location.

In a fourth embodiment, exemplary further aspects according to one of the above-referenced first to third embodiments may include an RF receiver configured with a plurality of channels each corresponding to one of the directional antennas associated with the vehicle for simultaneous implementation of the respective output signals there through.

Alternatively, the system may include an RF switching device configured to enable selection between each of the directional antennas associated with the vehicle for implementation of the respective output signals there through.

Exemplary further aspects according to one of the above-referenced first to fourth embodiments may include that the at least one tire and/or wheel sensor includes at least a tire pressure monitoring system (TPMS) sensor and/or a tire mounted sensor (TMS).

In a fifth embodiment, exemplary further aspects according to one of the above-referenced first to fourth embodiments may include that the data processing unit is further configured to accumulate in data storage historical information regarding tire wear for each tire, and to estimate a current tire wear status for each tire, based at least on the respectively identified wheel position and the stored historical information regarding tire wear.

Exemplary further aspects according to the above-referenced fifth embodiment may include that the data processing unit is further configured to predict one or more tire traction characteristics for each tire, based at least on the estimated tire wear status, to provide the one or more predicted tire traction characteristics to a vehicle control unit, and via a vehicle control unit to automatically modify one or more vehicle operation settings based on at least the predicted one or more tire traction characteristics.

Exemplary further aspects according to the above-referenced fifth embodiment may include that the data processing unit is further configured to, for each tire, predict a replacement time based on one or more of the current tire wear status and the predicted tire wear status, as compared with one or more tire wear thresholds.

Exemplary further aspects according to the above-referenced fifth embodiment may include that a respective tire wear threshold for a given tire corresponds to an identified wheel position associated with the tire.

Exemplary further aspects according to any one of the above-referenced first to fifth embodiments may include an onboard vehicle control unit comprising the data processing unit.

Alternatively, the system may include a server-based network or a mobile computing device comprising the data processing unit.

Alternatively, the data processing unit may be comprised of distributed and functionally interacting modules associated with any one or more of an onboard vehicle control unit, a server-based network, and/or a mobile computing device.

BRIEF DESCRIPTION OF THE SEVERAL VIEWS OF THE DRAWINGS

Hereinafter, embodiments of the invention are illustrated in more detail with reference to the drawings.

DETAILED DESCRIPTION

Figure 1:
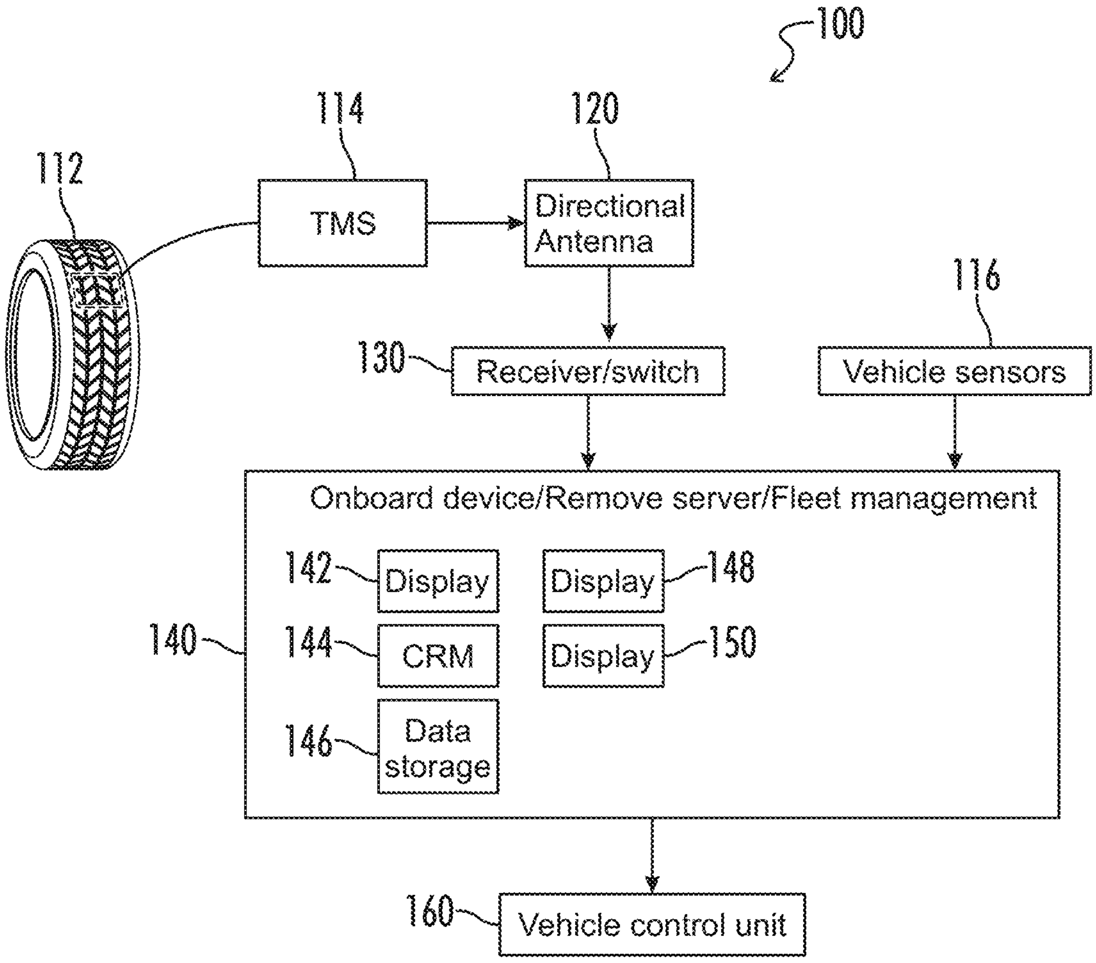
FIG. 1 is a block diagram representing an embodiment of a system for tire localization as disclosed herein.
Figure 2:
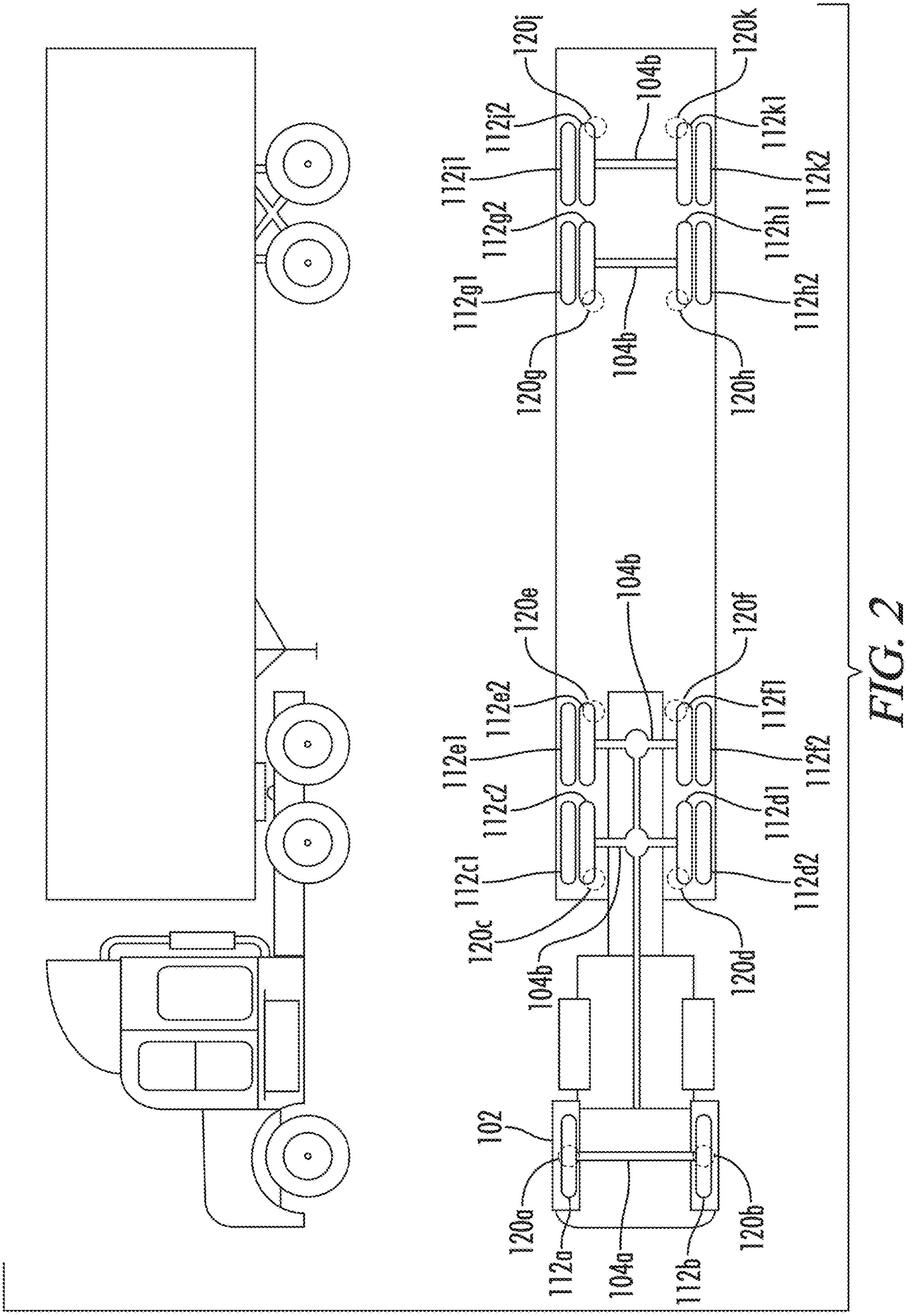
FIG. 2 is a modified top view representing an exemplary configuration of tire and/or wheel sensors and directional antennas in an embodiment of a system as disclosed herein.
Figure 3:
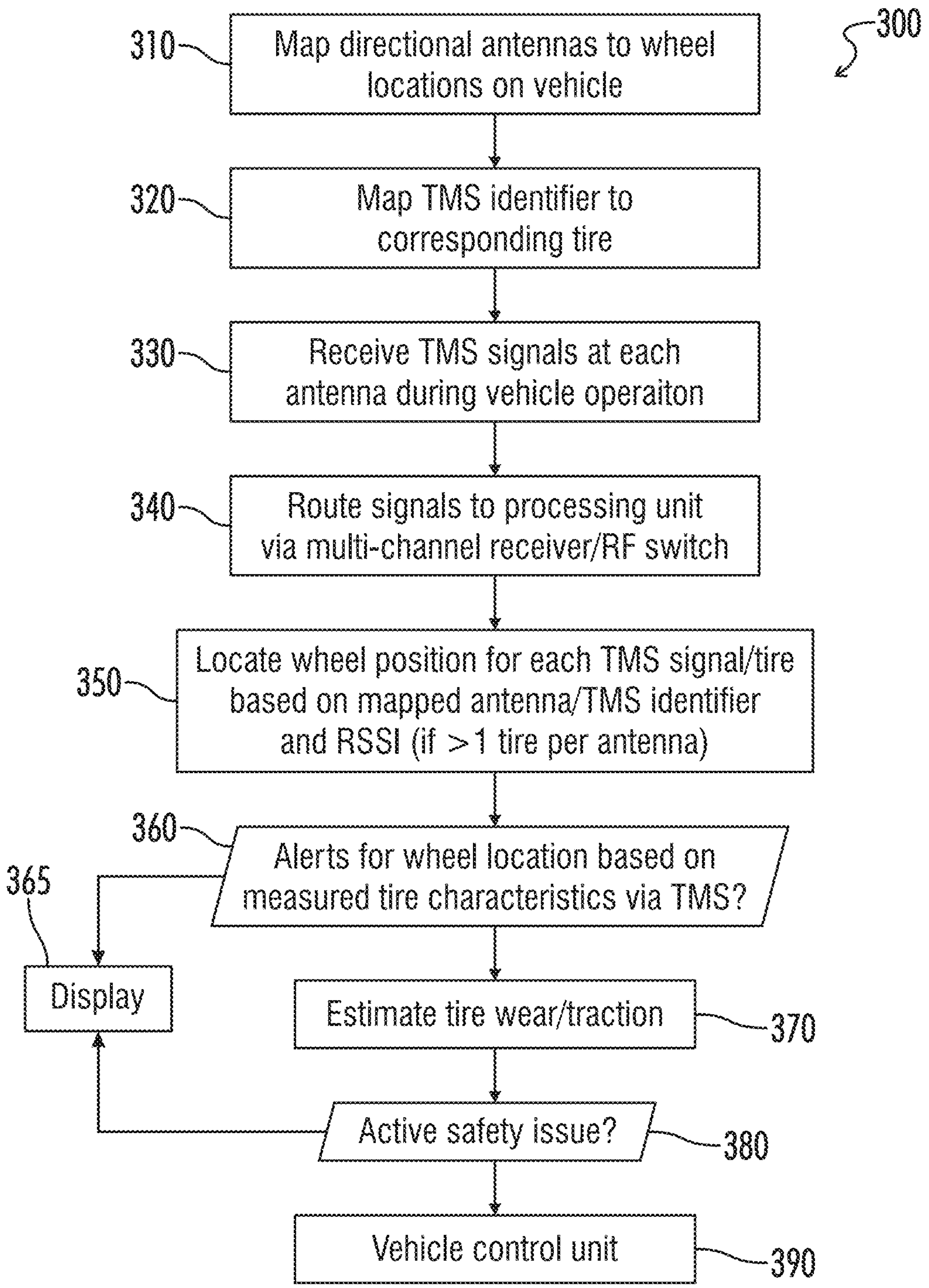
FIG. 3 is a flowchart representing an exemplary embodiment of a method of operation as disclosed herein.

Referring generally to FIGS. 1-3, various exemplary embodiments of an invention may now be described in detail. Where the various figures may describe embodiments sharing various common elements and features with other embodiments, similar elements and features are given the same reference numerals and redundant description thereof may be omitted below.

Referring initially to FIG. 1, an exemplary embodiment of a system 100 as disclosed herein may generally be applied for either commercial and passenger vehicles, and includes at least one tire and/or wheel sensor 114 provided for each of a plurality of tires 112 mounted on a vehicle. Tire and/or wheel sensors 114 may include any of various tire mounted sensors and in some embodiments tire pressure monitoring system (TPMS) sensors as are often currently included, e.g., on certain heavy-duty trucks. An example of a conventional TPMS includes a sensor transmitter functionally linked to a TPMS receiver, itself further linked to a data processing unit. The TPMS sensor transmitter may for example be provided in the interior air cavity of the tire 112 on either a tire wheel or an inner surface of the tire. The transmitter detects an internal pressure of the tire at a predetermined time interval, and wirelessly transmits output signals corresponding to an internal pressure value of the tire along with a unique identifier associated with the tire to the receiver. The transmitter may for example be mounted on a wheel rim so as to be integral with a tire valve. Alternatively, the transmitter may be attached to an inner surface of the tire. The receiver further relays the signals from the transmitter to the data processing unit via a communication means such as for example Bluetooth.

Other examples of tire and/or wheel sensors 114 within the scope of the present disclosure may include sensors mounted on a valve stem for the tire 112, or even mounted on an outer surface of the tire 112.

In certain embodiments, a single tire and/or wheel sensor 114 may be configured to transmit output signals comprising an identifier along with other data corresponding to measured tire characteristics, for example as part of a data string. In other embodiments, one or more tire and/or wheel sensors 114 on a given tire may be configured to generate output signals corresponding to measured tire characteristics, while another tire and/or wheel sensor 114 on the same tire is configured to generate identification data such as for example via an RFID tag separate from the first set of one or more tire and/or wheel sensors 114. In such embodiments, output signals from each of the tire and/or wheel sensors 114 may be continuously generated, or output signals from an RFID tag may be selectively generated or otherwise caused via commands from an external source or other tire and/or wheel sensors from the first set of one or more tire and/or wheel sensors, for example based upon an initialization of output signals as the vehicle begins operation.

Embodiments of the system 100 as represented in FIG. 1 further include a pair of directional antennas 120 mounted on the vehicle in association with each axle 104 thereof, and each of the directional antennas 120 for example directed outward from an inside position relative to the tires 112 for a corresponding vehicle axle 104. For single-tire axles 104, a directional antenna 120 is assigned for each tire 112*x*. However, for dual-tire axles 104 such as for example represented in FIG. 2, a single directional antenna 120 is assigned to the two tires 112*x*1, 112*x*2 on a given side where the antenna 120 is focused on one of those tires. Therefore, the antenna 120 will be more sensitive to the signal of the tire and/or wheel sensor 114 attached to the tire 112 in close proximity to the antenna 120 and less sensitive to the tire and/or wheel sensor 114 of the tire 112 further away from the antenna 120 on the same axle side. This sensitivity can be translated into Relative Signal Strength Indicator (RSSI) where the RSSI of the close-proximity tire and/or wheel sensor 114 signal will be higher than the RSSI of the signal coming from the tire and/or wheel sensor 114 further away from the antenna.

For example, referring to FIG. 2, a single-tire axle 104*a* is provided with directional antenna 120*a* for a single tire 112*a* on one side of the axle/vehicle and a directional antenna 120*b* for a single tire 112*b* on the other side of the axle/vehicle. An RSSI is not necessary as a factor for identifying the respective tires 112 in this context. It should be noted that the illustrated locations for the directional antennas 120*a*, 120*b* are not limiting on the scope of the embodiment, and may vary based at least in part on the design needs for a given vehicle, axle, antenna, etc., as long as the field of the directional antenna is arranged to reliably capture output signals from the relevant tire and/or wheel sensor. It may further be noted that while the illustrated embodiment and the description herein may state that a given directional antenna 120 is provided for or directed to a corresponding one or more tires 112, the directional antenna 120 is further provided for or directed to a corresponding one or more tire and/or wheel sensors 114 that are associated with those tires 112.

For a first dual-tire axle 104*b* as represented in FIG. 2 a directional antenna 120*c* on a first side of the axle/vehicle is directed to tires 112*c*1 and 112*c*2, and a directional antenna 120*d* on a second side of the axle/vehicle is directed to tires 112*d*1 and 112*d*2. In this example, the RSSI of a tire and/or wheel sensor 114*c*2 associated with tire 112*c*2 will be higher than the RSSI of a tire and/or wheel sensor 114*c*1 associated with tire 112*c*1 based on the antenna 120*c* received signal strength, and the RSSI of a tire and/or wheel sensor 114*d*2 associated with tire 112*d*2 will be higher than the RSSI of a tire and/or wheel sensor 114*d*1 associated with tire 112*d*1 based on the antenna 120*c* received signal strength. An equivalent arrangement and illustrative RSSI comparison may be readily apparent to one of skill in the art for each of the remaining dual-tire axles 104*b* of FIG. 2.

The ten directional antennas 120 on the commercial vehicle as represented in FIG. 2 may be connected to a data processing unit 140 via an RF switch 130 so that the output signals for each directional antenna 120 can be selectively received and analyzed separately. In an alternative embodiment, the directional antennas 120 may be communicatively coupled or functionally linked to a data processing unit 140 via a multi-channel receiver for simultaneous implementation of the respective output signals from each of the tire and/or wheel sensors 114. In yet another alternative embodiment, the directional antennas 120 may be connected to the data processing unit 140 via respective independent receivers (i.e., ten receivers for an embodiment including ten directional antennas).

The data processing unit 140 may take any of various forms within the scope of the present disclosure, including for example a fleet management device or server, a third-party server network, a computing device that is onboard the vehicle and configured to at least obtain data and transmit the data to a remote server and/or perform relevant computations as disclosed herein, and the like. An onboard computing device as the data processing unit 140, a component thereof, or an intermediary between the directional antennas 120 and the data processing unit 140 may be portable or otherwise modular as part of a distributed vehicle data collection and control system, or otherwise may be integrally provided with respect to a central vehicle data collection control system, for example including an electronic control unit (ECU) 160. The data processing unit 140 may for example include or be functionally linked to a display unit 142, a processor 148, memory/computer readable media 144 having program logic residing thereon, and data storage 146 for example including mapped locations for each directional antenna 120, tire data and/or vehicle operation data, whether directly or indirectly measured and stored, models derived therefrom over time, etc. The data processing unit 140 may further include a communications unit 150 for wired or wireless connection to the various vehicle components, control units, server networks, and the like.

A system 100 as disclosed herein may accordingly implement numerous components distributed across one or more vehicles, for example but not necessarily associated with a fleet management entity, and further a central server or server network in functional communication with each of the vehicles via a communications network. The vehicle components may typically include one or more sensors 116 in addition to the above-referenced tire and/or wheel sensors 114 and related onboard components, such as for example vehicle body accelerometers, gyroscopes, inertial measurement units (IMU), position sensors such as global positioning system (GPS) transponders, ambient temperature sensors, engine sensors, or the like, as linked for example to a controller area network (CAN) bus network and providing signals thereby to the data processing unit 140 or other local processing units.

In view of the following discussion, other sensors for collecting and transmitting vehicle data such as pertaining to velocity, acceleration, braking characteristics, or the like will become sufficiently apparent to one of ordinary skill in the art and are not further discussed herein. Various bus interfaces, protocols, and associated networks are well known in the art for the communication of vehicle kinetics data or the like between the respective data source and the local computing device, and one of skill in the art would recognize a wide range of such tools and means for implementing the same.

The system 100 may include a data processing unit 140 which is not discrete in nature even in the example of an onboard computing device but further comprises additional distributed program logic such as for example residing on a fleet management server or other user computing device, or a user interface of a device resident to the vehicle or associated with a driver thereof (not shown) for real-time notifications (e.g., via a visual and/or audio indicator), with the fleet management device in some embodiments being functionally linked to the onboard device via a communications network. System programming information may for example be provided onboard by the driver or from a fleet manager.

Referring next to FIG. 3, an exemplary embodiment of a method 300 according to the present disclosure may include a first step of mapping a plurality of directional antennas 120 to respective wheel locations on a vehicle (step 310). As previously noted, through the use of directional antennas 120 it is possible to isolate and readily identify output signals from tire and/or wheel sensors 114 within the relevant fields with respect to the mapped wheel locations.

Tire and/or wheel sensors 114 may in an embodiment further be provided with unique identifiers that are transmitted via the directional antennas 120 and the receiver/RF switch 130. The method 300 may accordingly further include mapping tire and/or wheel sensor identifiers to each of a corresponding set of tires (step 320), particularly where the output signals from the tire and/or wheel sensors during use include such identifiers, for example using radio frequency identification (RFID), wherein the data processing unit 140 can distinguish between signals provided from respective sensors 114 on the same vehicle, and further in for example a fleet management context distinguish between signals provided from tires 112 and associated tire and/or wheel sensors 114 across a plurality of vehicles. In other words, sensor output values may in various embodiments be associated with a particular tire, a particular vehicle, and/or a particular tire-vehicle system for the purposes of onboard or remote/downstream data storage and implementation as disclosed herein. A tire 112 that is relocated from a first wheel on a vehicle may accordingly be readily identifiable as having been moved from the first wheel to another wheel on the same vehicle or a different vehicle as output signals are subsequently transmitted to the respective data processing unit 140. In various embodiments it may be assumed for example that the tire and/or wheel sensors 114 are mounted inside or otherwise to the tires in a manner that is substantially fixed, but in alternative cases where a first tire and/or wheel sensor is foreseeably removable from an initial tire and replaceable with another (e.g., second) tire and/or wheel sensor, the system 100 may further be configured to map durations of time associated with the first tire and/or wheel sensor being mounted on a given tire and durations of time associated with the second tire and/or wheel sensor being mounted on the same tire, for the purpose of for example monitoring tire conditions over time.

The exemplary method 300 further includes receiving tire and/or wheel sensor 114 output signals at corresponding directional antennas 120 during vehicle operation (step 330), and routing the output signals to the data processing unit 140 via for example the above-referenced RF switch or multi-channel receiver 130.

Signals received from a particular tire and/or wheel sensor 114 may be stored in onboard device memory, or an equivalent data storage unit functionally linked to the onboard device processor, for selective retrieval as needed for models, calculations, displayed alerts, or the like according to methods as disclosed herein. In some embodiments, raw data signals from the various tire and/or wheel sensors 114 may be communicated substantially in real time from the vehicle to a remote server. Alternatively, particularly in view of the inherent inefficiencies in continuous data transmission of high frequency data, the data may for example be compiled, encoded, and/or summarized for more efficient (e.g., periodic time-based or alternatively defined event-based) transmission from the vehicle to the remote server via an appropriate communications network.

In step 350, the mapped locations in data storage for each of the relative directional antennas 120 may be used in association with the output signals received via the respective directional antennas 120 to further ascertain a wheel position for each tire and/or wheel sensor 114 generating the output signals. Referring again to FIG. 2 for example, directional antenna 120*k* may be digitally mapped in association with two known wheel positions along one side of a particular dual-tire axle 104*b*. Output signals received via directional antenna 120*k* are distinguishable at least in view of the respective identifiers associated with tire and/or wheel sensors 114 for tires 112*k*1 and 112*k*2 and/or their relative signal strengths (RSSI). The data processing unit 140 or other relevant portion of the system 100 may accordingly store and optionally aggregate tire data and/or vehicle-tire data in association with one or more of the tire and/or wheel sensors 114 (and therefore the tires 112*k*1 and 112*k*2 upon which the sensor is mounted or otherwise associated), the wheel position on the vehicle, the axle, the vehicle, the driver, etc.

Following on this example, the tire 112*k*1 may later be moved to another location on the vehicle, for illustrative purposes to replace tire 112*d*2 as shown in FIG. 2. During subsequent operation of the vehicle, data processing unit 140 (via the directional antenna 120*d*) receives output signals from the tire and/or wheel sensor 114 associated with tire 112*k*1 and output signals from the tire and/or wheel sensor 114 associated with tire 112*d*1, and ascertains that the tire and/or wheel sensor 114 associated with tire 112*k*1 is at the new wheel position based on the identifier associated with the tire and/or wheel sensor and also in view of the relative signal strength (RSSI). The data processing unit 140 or other relevant portion of the system 100 may then accordingly continue to store and optionally aggregate tire data and/or vehicle-tire data associated with the tire 112*k*1 in view of the new wheel position.

As previously noted, output signals from the tire and/or wheel sensors 114 such as for example tire pressure monitoring system (TPMS) sensors may include or otherwise correspond to real-time measurements with respect to values such as tire inflation pressure, contained air temperature, acceleration, and the like. Such measurements may be monitored directly or indirectly ascertained at the data processing unit 140 or other downstream computing device such as a remote server or fleet management network, and used to determine whether an alert should be generated for a given tire based on tire characteristics thereof (e.g., based on low tire inflation pressure), for a given wheel location, for a given vehicle-tire combination, driver, etc. (step 360). Such an alert may take the form of a visual display or audio-visual alert generated for example on an onboard user interface/display unit or a discrete display unit such as on a mobile computing device associated with the operator of the vehicle (step 365).

In an embodiment the tire data and/or vehicle-tire data, once transmitted via a communications network to a remote server or fleet management network, may be stored for example in a database associated therewith. The server/device/network may include or otherwise be associated with tire wear models and/or tire traction models for selectively retrieving and processing the tire-vehicle data and/or tire data as appropriate inputs (step 370). The models may be selectively implemented, manually or automatically based on identified trigger activities or measurements, or may for example be periodically implemented on a timed basis, further enabling retrieval of the vehicle-data data and/or tire data and in electronic communication for the input of any additional relevant data or algorithms from a database, lookup table, or the like that is stored in association with the server.

Various tire wear values may be estimated based on, e.g., "digital twin" virtual representations of various physical parts, processes or systems wherein digital and physical data is paired and combined with learning systems such as for example neural networks. For example, real data from a vehicle and associated location/route information may be provided to generate a digital representation of the vehicle tire for estimation of tire wear, wherein subsequent comparison of the estimated tire wear with a determined actual tire wear may be implemented as feedback for the machine learning algorithms. The wear model may be implemented at the vehicle, for processing via the onboard system, or the tire data and/or vehicle data may be processed to provide representative data to the hosted server for remote wear estimation.

A tire wear status (e.g., tread depth) may for example be provided along with certain vehicle data as inputs to a traction model, which may be configured to provide an estimated traction status or one or more traction characteristics for the respective tire. As with the aforementioned wear model, the traction model may comprise "digital twin" virtual representations of physical parts, processes or systems wherein digital and physical data are paired and combined with learning systems such as for example artificial neural networks. Real vehicle data and/or tire data from a particular tire, vehicle or tire-vehicle system may be provided throughout the life cycle of the respective asset to generate a virtual representation of the vehicle tire for estimation of tire traction, wherein subsequent comparison of the estimated tire traction with a corresponding measured or determined actual tire traction may for example result in an alert corresponding to an ascertained active safety issue (step 380), wherein the alert is generated substantially in real-time for operator notice on a relevant display unit (step 365), and/or may be implemented as feedback for machine learning algorithms executed at the remote server and/or fleet management device/network level.

The traction model may in various embodiments utilize the results from prior testing, including for example stopping distance testing results, tire traction testing results, etc., as collected with respect to numerous tire-vehicle systems and associated combinations of values for input parameters (e.g., tire tread, inflation pressure, road surface characteristics, vehicle speed and acceleration, slip rate and angle, normal force, braking pressure and load), wherein a tire traction output may be effectively predicted for a given set of current vehicle data and tire data inputs.

In one embodiment, outputs from this traction model may be provided to a vehicle control unit, such as for example to be incorporated into an active safety system (step 390). The term "active safety systems" as used herein may preferably encompass such systems as are generally known to one of skill in the art, including but not limited to examples such as collision avoidance systems, advanced driver-assistance systems (ADAS), anti-lock braking systems (ABS), etc., which can be configured to utilize the traction model output information to achieve optimal performance. For example, collision avoidance systems are typically configured to take evasive action, such as automatically engaging the brakes of a host vehicle to avoid or mitigate a potential collision with a target vehicle, and enhanced information regarding the traction capabilities of the tires and accordingly the braking capabilities of the tire-vehicle system are eminently desirable.

In another embodiment, a ride-sharing autonomous fleet could use output data from the traction model to disable or otherwise selectively remove vehicles with low tread depth from use during inclement weather, or potentially to limit their maximum speeds.

In various embodiments, the method may further involve comparing a current wear value with respect to a threshold value to determine whether (or when) the tire requires replacement. The method may alternatively or further include predicting wear values at one or more future points in time, wherein such predicted values may be compared to respective threshold values. A feedback signal corresponding to the predicted tire wear status (e.g., predicted tread depth at a given distance, time, or the like) may for example be provided via an interface to an onboard display unit (step 365) associated with the vehicle itself, or to a mobile device associated with a user, such as for example integrating with a user interface configured to provide alerts or notice/recommendations that a tire should or soon will need to be replaced.

As another example, an autonomous vehicle fleet may comprise numerous vehicles having varying minimum tread status values, wherein the fleet management system may be configured to disable deployment of vehicles falling below a minimum threshold. The fleet management system may further implement varying minimum tread status values corresponding to wheel positions. The system may accordingly be configured to act upon a minimum tire tread value for each of a plurality of tires associated with a vehicle, or in an embodiment may calculate an aggregated tread status for the plurality of tires for comparison against a minimum threshold.

In various embodiments the method may further include data streaming even where threshold violations are not detected, wherein estimated and/or predicted wear values can be displayed in real-time on the local user interface and/or a remote display (e.g., associated with the fleet management server), and further displayed data may include, e.g., the contained air temperature.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, “can,” “might,” “may,” “e.g.,” and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Whereas certain preferred embodiments of the present invention may typically be described herein with respect to tire wear estimation for fleet management systems and more particularly for autonomous vehicle fleets or commercial trucking applications, the invention is in no way expressly limited thereto and the term “vehicle” as used herein unless otherwise stated may refer to an automobile, truck, or any equivalent thereof, whether self-propelled or otherwise, as may include one or more tires and therefore require accurate estimation or prediction of tire wear and potential disabling, replacement, or intervention in the form of for example direct vehicle control adjustments.

The term “user” as used herein unless otherwise stated may refer to a driver, passenger, mechanic, technician, fleet management personnel, or any other person or entity as may be, e.g., associated with a device having a user interface for providing features and steps as disclosed herein.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for vehicle wheel position localization, comprising:

at least one tire and/or wheel sensor respectively associated with each of a plurality of tires mounted on a vehicle, wherein the vehicle comprises at least one axle having a single tire on each of a first side and a second side and at least one axle having a plurality of tires on each of the first side and the second side;

a pair of directional antennas mounted on the vehicle in association with each axle thereof, wherein for each of the axles, a first directional antenna of the respective pair of directional antennas is arranged to capture wireless output signals from the respective at least one tire associated with the axle on the first side and a second directional antenna of the respective pair of directional antennas is arranged to capture wireless output signals from the respective at least one tire associated with the axle on the second side;

a data processing unit configured to receive the output signals from each of the tire and/or wheel sensors via at least the respective directional antennas, and further configured to automatically identify a respective wheel location on the vehicle for each of the tires based on a mapped relative location for each of the directional antennas and further based on a detected relative output signal strength for at least the tire and/or wheel sensors associated with the plurality of axles having a plurality of tires on each of the first side and the second side; and an RF switching device connecting the directional antennas to the data processing unit and configured to selectively receive output signals from each of the directional antennas associated with the vehicle for implementation of the respective output signals there through.

2. The system of claim 1, wherein the wireless output signals from each tire comprise data corresponding to one or more measured tire characteristics.

3. The system of claim 2, wherein the wireless output signals from a single tire and/or wheel sensor for at least one tire comprise an identifier unique to the respective tire and the data corresponding to one or more measured tire characteristics.

4. The system of claim 2, wherein the wireless output signals from at least one tire comprise radio frequency identification (RF) signals unique to the respective tire via an RFID tag as a first tire and/or wheel sensor and the data corresponding to one or more measured tire characteristics from a second tire and/or wheel sensor.

5. The system of claim 2, wherein the data processing unit is configured to associate at least one of the one or more measured tire characteristics in data storage with each of the respectively identified tire and/or wheel sensor and the wheel location on the vehicle.

6. The system of claim 5, wherein the data processing unit is configured to detect a change in position for an identified tire and/or wheel sensor and corresponding tire from a first wheel location to a second wheel location on the vehicle, and to aggregate at least one of the one or more measured tire characteristics in data storage as received from the identified tire and/or wheel sensor at each of the first wheel location and the second wheel location.

7. The system of claim 1, further comprising a wireless signal receiver configured with a plurality of channels each corresponding to one of the directional antennas associated with the vehicle for simultaneous implementation of the respective output signals there through.

8. The system of claim 1, wherein the at least one tire and/or wheel sensor includes at least a tire pressure monitoring system (TPMS) sensor.

9. The system of claim 1, wherein the at least one tire and/or wheel sensor includes at least a tire mounted sensor (TMS).

10. The system of claim 1, wherein the data processing unit is further configured to:

accumulate in data storage historical information regarding tire wear for each tire; and estimate a current tire wear status for each tire, based at least on the respectively identified wheel position and the stored historical information regarding tire wear.

11. The system of claim 10, wherein the data processing unit is further configured to:

predict one or more tire traction characteristics for each tire, based at least on the estimated tire wear status;

provide the one or more predicted tire traction characteristics to a vehicle control unit associated with the vehicle; and via the vehicle control unit, automatically modify one or more vehicle operation settings based on at least the predicted one or more tire traction characteristics.

12. The system of claim 10, wherein the data processing unit is further configured to:

for each tire, predict a replacement time based on one or more of the current tire wear status and the predicted tire wear status, as compared with one or more tire wear thresholds.

13. The system of claim 12, wherein a respective tire wear threshold for a given tire corresponds to an identified wheel position associated with the tire.

14. The system of claim 1, further comprising an onboard vehicle control unit comprising the data processing unit.

15. The system of claim 1, further comprising a server-based network comprising the data processing unit.

16. The system of claim 1, further comprising a mobile computing device comprising the data processing unit.

17. A computer-implemented method for wheel position localization on a vehicle comprising at least one tire and/or wheel sensor respectively associated with each of a plurality of tires mounted thereon, wherein the vehicle further comprises at least one axle having a single tire on each of a first side and a second side and at least one axle having a plurality of tires on each of the first side and the second side, and a pair of directional antennas mounted on the vehicle in association with each axle thereof, wherein for each of the axles, a first directional antenna of the respective pair of directional antennas is arranged to capture wireless output signals from the respective at least one tire associated with the axle on the first side and a second directional antenna of the respective pair of directional antennas is arranged to capture wireless output signals from the respective at least one tire associated with the axle on the second side, wherein the method comprises:

receiving the output signals from each of the tire and/or wheel sensors via at least the respective directional antennas, further via an RF switching device operatively connecting the directional antennas to a data processing unit, the RF switching device configured to selectively receive the output signals from each of the directional antennas associated with the vehicle for implementation of the respective output signals there through; and automatically identifying a respective wheel location on the vehicle for each of the tires based on a mapped relative location for each of the directional antennas and further based on a detected relative output signal strength for at least the tire and/or wheel sensors associated with the plurality of axles having a plurality of tires on each of the first side and the second side.

18. The method of claim 17, wherein the wireless output signals from each tire comprise data corresponding to one or more measured tire characteristics, the method further comprising:

associating at least one of the one or more measured tire characteristics in data storage with each of the respectively identified tire and/or wheel sensor and the wheel location on the vehicle;

detecting a change in position for an identified tire and/or wheel sensor and corresponding tire from a first wheel location to a second wheel location on the vehicle; and aggregating at least one of the one or more measured tire characteristics in data storage as received from the identified tire and/or wheel sensor at each of the first wheel location and the second wheel location.

19. The method of claim 17, further comprising:

accumulating in data storage historical information regarding tire wear for each tire;

estimating a current tire wear status for each tire, based at least on the respectively identified wheel position and the stored historical information regarding tire wear; and for each tire, predicting a replacement time based on one or more of the current tire wear status and the predicted tire wear status, as compared with one or more tire wear thresholds;

wherein a respective tire wear threshold for a given tire corresponds to an identified wheel position associated with the tire.

20. A system for vehicle wheel position localization, comprising:

at least one tire and/or wheel sensor respectively associated with each of a plurality of tires mounted on a vehicle, wherein the vehicle comprises at least one axle having a single tire on each of a first side and a second side and at least one axle having a plurality of tires on each of the first side and the second side;

a pair of directional antennas mounted on the vehicle in association with each axle thereof, wherein for each of the at least one axle having the plurality of tires on each of the first side and the second side, a first directional antenna of the respective pair of directional antennas is arranged to capture wireless output signals from each of the plurality of tires associated with the axle on the first side with differing signal strengths based on proximity to the first directional antenna and a second directional antenna of the respective pair of directional antennas is arranged to capture wireless output signals from each of the plurality of tires associated with the axle on the second side with differing signal strengths based on proximity to the second directional antenna;

a data processing unit configured to receive the output signals from each of the tire and/or wheel sensors via at least the respective directional antennas, and further configured to automatically identify a respective wheel location on the vehicle for each of the tires based on a mapped relative location for each of the directional antennas and further based on a detected relative output signal strength based on proximity to the respective directional antenna for at least the tire and/or wheel sensors associated with the plurality of axles having a plurality of tires on each of the first side and the second side; and a switching device configured to enable selection between each of the directional antennas associated with the vehicle for implementation of the respective output signals there through.

* * * * *